(12) United States Patent
Huang et al.

(10) Patent No.: US 10,432,117 B1
(45) Date of Patent: Oct. 1, 2019

(54) SYSTEM AND METHOD FOR MONITORING MOVER STATUS IN AN INDEPENDENT CART SYSTEM

(71) Applicant: Rockwell Automation Technologies, Inc., Mayfield Heights, OH (US)

(72) Inventors: Yuhong Huang, Acton, MA (US); Oliver C. Haya, Milwaukee, WI (US); Neil R. Bentley, Westborough, MA (US); Robert H. Schmidt, Germantown, WI (US); Eric J. Wildi, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/015,699

(22) Filed: Jun. 22, 2018

(51) Int. Cl.
| | |
|---|---|
| *H02P 7/025* | (2016.01) |
| *H02K 41/035* | (2006.01) |
| *H02K 11/21* | (2016.01) |
| *B65G 23/00* | (2006.01) |
| *B65G 51/03* | (2006.01) |
| *B65G 43/00* | (2006.01) |
| *H02K 11/35* | (2016.01) |
| *H04L 29/08* | (2006.01) |

(52) U.S. Cl.
CPC .............. *H02P 7/025* (2016.02); *B65G 23/00* (2013.01); *B65G 43/00* (2013.01); *B65G 51/03* (2013.01); *H02K 11/21* (2016.01); *H02K 11/35* (2016.01); *H02K 41/0354* (2013.01); *H04L 67/12* (2013.01)

(58) Field of Classification Search
CPC ...................................................... H02P 7/025

USPC ....................................................... 318/135, 34
See application file for complete search history.

(56) References Cited

U.S. PATENT DOCUMENTS

| | | | |
|---|---|---|---|
| RE39,747 E | 7/2007 | Peltier et al. | |
| 7,421,193 B2 * | 9/2008 | Kobayashi | ............... H02P 7/03 318/599 |
| 7,448,327 B2 | 11/2008 | Thornton et al. | |
| 8,863,669 B2 | 10/2014 | Young et al. | |
| 9,346,371 B2 | 5/2016 | King et al. | |
| 9,997,985 B2 | 6/2018 | Prussmeier | |
| 2007/0290638 A1 | 12/2007 | Faizullabhoy et al. | |
| 2008/0006172 A1 | 1/2008 | Thornton | |
| 2015/0360581 A1 | 12/2015 | King et al. | |
| 2018/0090254 A1 | 3/2018 | Ozimek et al. | |

* cited by examiner

*Primary Examiner* — David Luo
(74) *Attorney, Agent, or Firm* — Boyle Fredrickson, SC

(57) ABSTRACT

An improved system and method for monitoring operation of movers in an independent cart system reduces the required communication bandwidth for monitoring operation of movers in a system where control is distributed among multiple controllers spaced along the track. As the mover is travelling along the track segment, each distributed controller monitors at least one operating characteristic of the mover. As a mover travels along the track, each distributed controller transmits the operating characteristic to a successive distributed controller, such the monitored operating characteristic is transmitted along the track as the mover travels along the track. At a reduced rate or upon request from a central controller, each distributed controller may transmit the status of a mover present on the corresponding track segment controlled by that distributed controller to the central controller.

20 Claims, 5 Drawing Sheets

SYSTEM AND METHOD FOR MONITORING MOVER STATUS IN AN INDEPENDENT CART SYSTEM

BACKGROUND INFORMATION

The subject matter disclosed herein relates to a motion control system with independent carts and a linear drive system. More specifically, a system and method is disclosed for monitoring operation of the independent carts as they travel along the linear drive system.

Motion control systems utilizing movers and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a path, which could be a closed path, over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

The track is typically formed of multiple segments. Each segment spans a portion of the distance of the entire track and may have various configurations. For example, the segment may be a straight segment having various lengths. Optionally, the segment may be a curved segment where the measure of the arc formed by the curved segment may be, for example, a forty-five degree (45°) arc or a ninety degree (90°) arc. Still other segments may define a switch to or from a second path along the track. The segments required for any track are selected according to the application requirements.

Control of the movers along the track may occur primarily from a central controller or may be distributed to segment controllers positioned along the track. Selection of a controller is dependent on a number of factors including, for example, the size of the track. In some applications, the track may form a continuous loop extending over a short distance, where a function is performed along one side of the loop and the movers return along the opposite side of the loop. In these applications, it may be desirable to utilize a central controller which controls operation of each of the segments. In other applications, the length of the track may span, for example, an entire warehouse and include multiple paths along which the movers may travel. In these applications, it may be desirable to distribute control of the movers to segment controllers located on each segment of the track.

Regardless of whether the movers are controlled by a central controller, segment controllers, or a combination thereof, it may be desirable to monitor the status of movers as they travel along the track. However, monitoring operation of the movers as they travel across different segments of track is not without certain difficulties. The difficulties are increased when control of the movers is distributed to segment controllers. Each segment controller is responsible for controlling operation of the mover along one segment of the track. The segment controllers, however, are unaware of how the mover operates along any other segment of the track. Historically, monitoring operation of a mover would require each segment controller to repeatedly transmit status of a mover to a central controller as the mover travels along the segment. The central controller, in turn, would be required to receive communications from each of the segment controllers, compile data corresponding to operation of one mover received from each of the segment controllers, and generate a report corresponding to the operation or each mover. As the number of movers and number of segments in the system increase, however, the number of data packets that must be transmitted, similarly increases, using a significant portion of the bandwidth of an industrial network connected between the segment controllers and the central controller.

Thus, it would be desirable to provide an improved system and method for monitoring operation of movers in an independent cart system. It would further be desirable to provide a system which reduces the required communication bandwidth for monitoring operation of movers in a system where control is distributed among multiple controllers spaced along the track.

BRIEF DESCRIPTION

The subject matter disclosed herein describes an improved system and method for monitoring operation of movers in an independent cart system. More specifically, the subject matter disclosed herein describes a system which reduces the required communication bandwidth for monitoring operation of movers in a system where control is distributed among multiple controllers spaced along the track. Each of the distributed controllers receives a motion command corresponding to desired operation of each mover located on the segment of track controlled by the distributed controller. The distributed controller generates commands to drive multiple coils spaced along the segment of the track, where each mover is driven along the track segment responsive to an electromagnetic field generated by the coils. As the mover is travelling along the track segment, each distributed controller monitors at least one operating characteristic of the mover. As a mover transitions between adjacent track segments, the distributed controller generates a data packet corresponding to the mover which includes status of the monitored operating characteristic. The data packet is transmitted between distributed controllers of the adjacent track segments. The distributed controller of the new track segment onto which the mover has transitioned continues to monitor and updates the status of the operating characteristic of the mover which was included in the data packet. As a mover travels along the track, each distributed controller continues to transmit the operating characteristic to successive distributed controller, such the monitored operating characteristic is transmitted along the track as the mover travels along the track. At a reduced rate or upon request from a central controller, each distributed controller may transmit the status of a mover present on the corresponding track segment controlled by that distributed controller to the central controller. Thus, the status of a mover is only transmitted between adjacent controllers as a mover transitions between track segments and transmitted to a central controller only upon request or at a reduced rate, thereby reducing the bandwidth of communications required on the industrial network.

In one embodiment of the invention, a linear drive system includes multiple movers and a track having multiple track segments. Each track segment has multiple coils positioned along a length of the track segment and a segment controller. Each segment controller includes a communication interface operative to communicate with at least one other segment controller located in an adjacent track segment, at least one position sensor operative to generate a position feedback signal corresponding to the presence of one of the plurality of movers along the length of the track segment, and a processor. The processor receives a motion command and controls operation of each of the coils to drive at least one of the movers along the track segment responsive to the motion command. The processor determines an operating characteristic of the mover driven along the track segment and generates a data packet corresponding to the mover. The operating characteristic is selected from one of a length of travel and a power loss for the at least one mover driven along the track segment and is inserted in the data packet. The data packet is transferred to the other segment controller in the adjacent track segment via the communication interface when the mover is driven from the track segment to the adjacent track segment.

According to another embodiment of the invention, a linear drive system includes multiple movers and a track with multiple track segments. Each track segment has multiple coils positioned along a length of the track segment and at least one sensor operative to generate a feedback signal corresponding to the presence of one of the movers along the length of the track segment. Energization of the coils is sequenced to drive the movers along a length of the track segment. The system also includes a controller operative to receive a motion command for each of the movers, control energization of the coils to drive each of the movers along the track segment responsive to the motion command, and execute at a periodic interval to generate current commands for the coils, where each of the current commands corresponds to one of the movers. The controller is also operative to determine a total magnitude of current present during one periodic interval in each of the coils energized to drive one of the movers responsive to one of the current commands and to determine a power loss for each of the movers as a function of the total magnitude of current in each of the coils energized to drive the mover.

According to still another embodiment of the invention, a method for monitoring operation of each mover in a linear drive system is disclosed. The linear drive system includes multiple movers and a track having multiple track segments. A motion command is received at a segment controller for one of the track segments, and the segment controller controls operation of multiple coils spaced along a length of the track segment to drive at least one of the movers along the track segment responsive to the motion command. An operating characteristic of the at least one mover driven along the track segment is determined, where the operating characteristic is selected from either a length of travel or a power loss for the at least one mover driven along the track segment. A data packet corresponding to the at least one mover is generated, where the data packet includes the operating characteristic. The data packet is transferred to at least one other segment controller in an adjacent track segment when the mover is driven from the track segment to the adjacent track segment.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
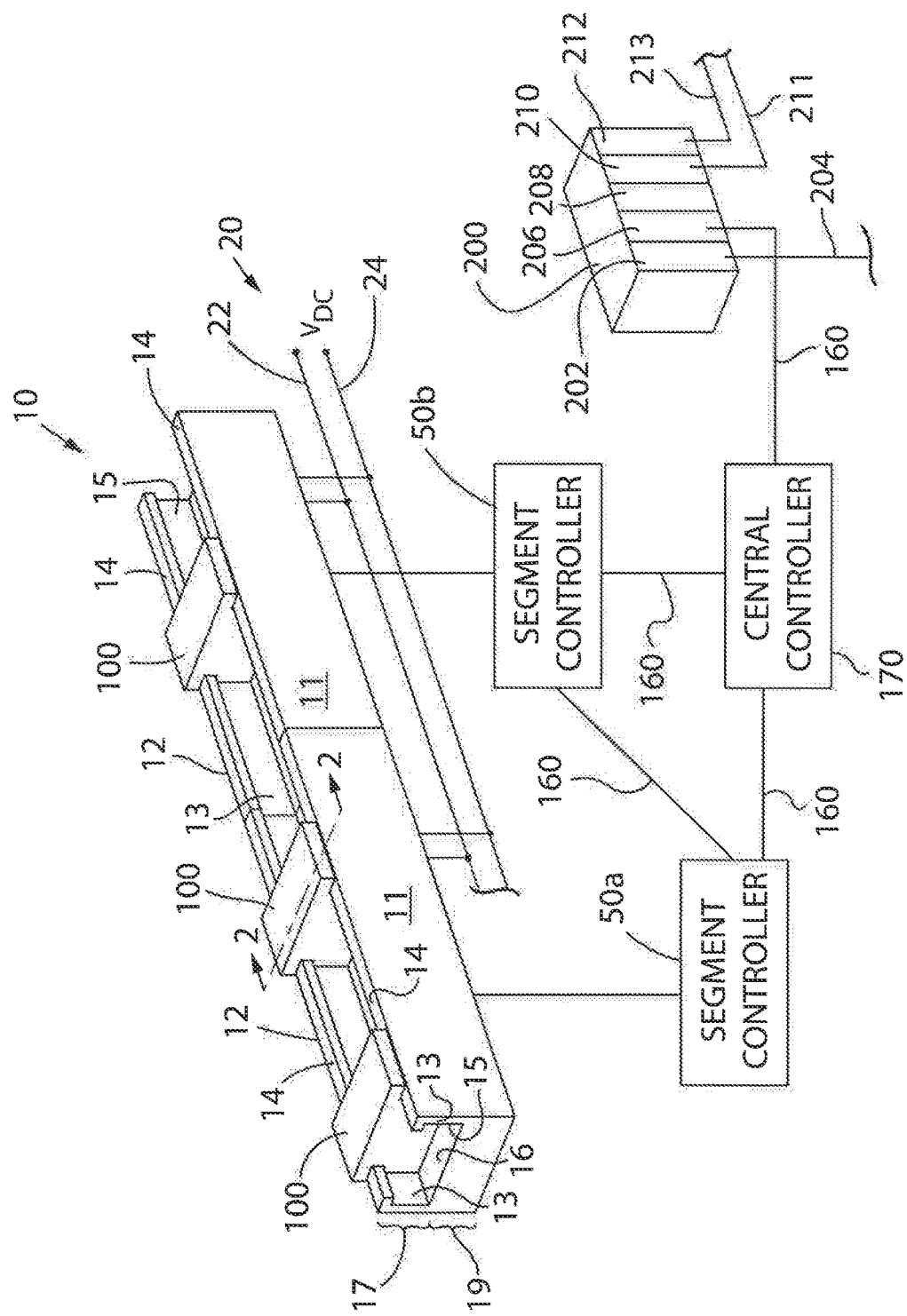
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

With respect to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In one embodiment, track segments 12 may be joined to form a generally closed loop supporting a set of independent carts, also referred to herein as movers, 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each mover 100 is configured to slide along the channel 15 as it is propelled by a linear drive system. The mover 100 includes a body 102 configured to fit within the channel 15. In one embodiment, the body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 15 in which the rail 14 runs. The channel 15 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100.

Figure 3:
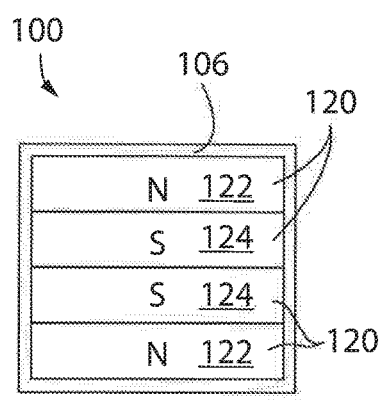
FIG. 3 is a bottom plan view of the exemplary mover of FIG. 2.
Figure 4:
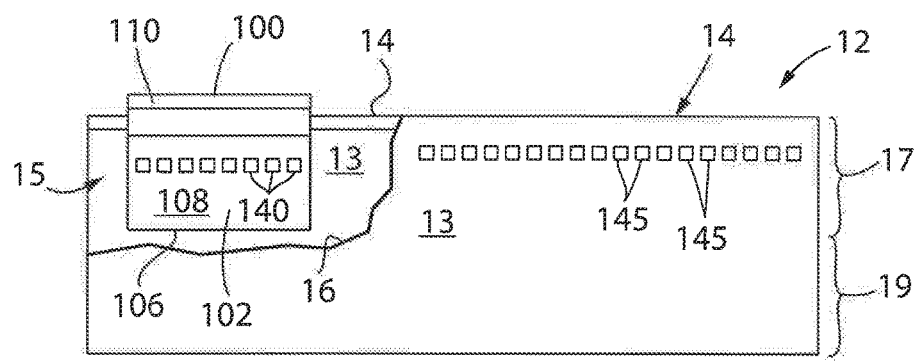
FIG. 4 is a partial side cutaway view of the mover and track segment of FIG. 2.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing inward to the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
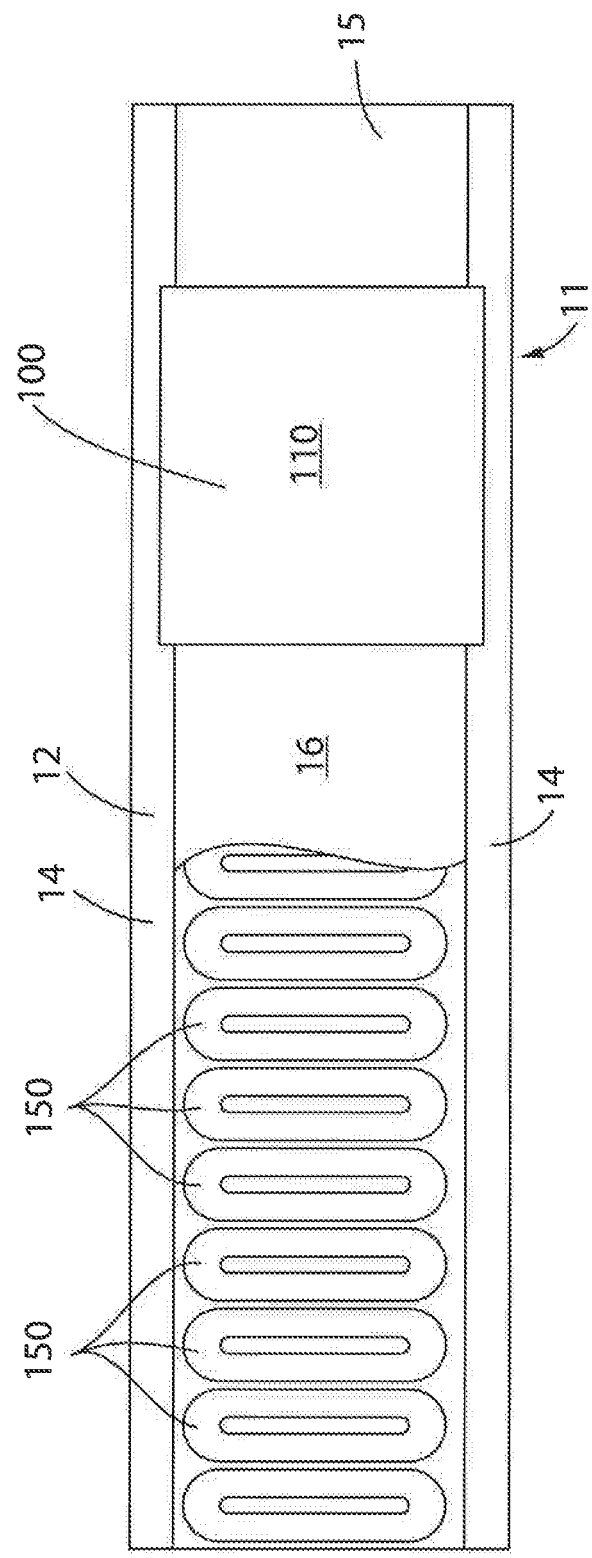
FIG. 5 is a partial top cutaway view of the mover and track segment of FIG. 2.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated as blocks in FIG. 1 external to the track segments 12, the illustration is to facilitate illustration of interconnects between controllers. As shown in FIG. 2, it is contemplated that each segment controller 50 may be mounted in the lower portion 19 of the track segment 12. Each segment controller 50 is in communication with an adjacent segment controller 50 and a central controller 170 which is, in turn, in communication with an industrial controller 200. Accordingly, each segment controller 50 can interact with other controllers to establish routing and global move parameters to re-create overall commands from the industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes a power supply 202 with a power cable 204 connected, for example, to a utility power supply; a communication module 206 connected by a network medium 160 to the central controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 where the central controller 170 operates to generate commands for each segment controller 50.

Figure 6:
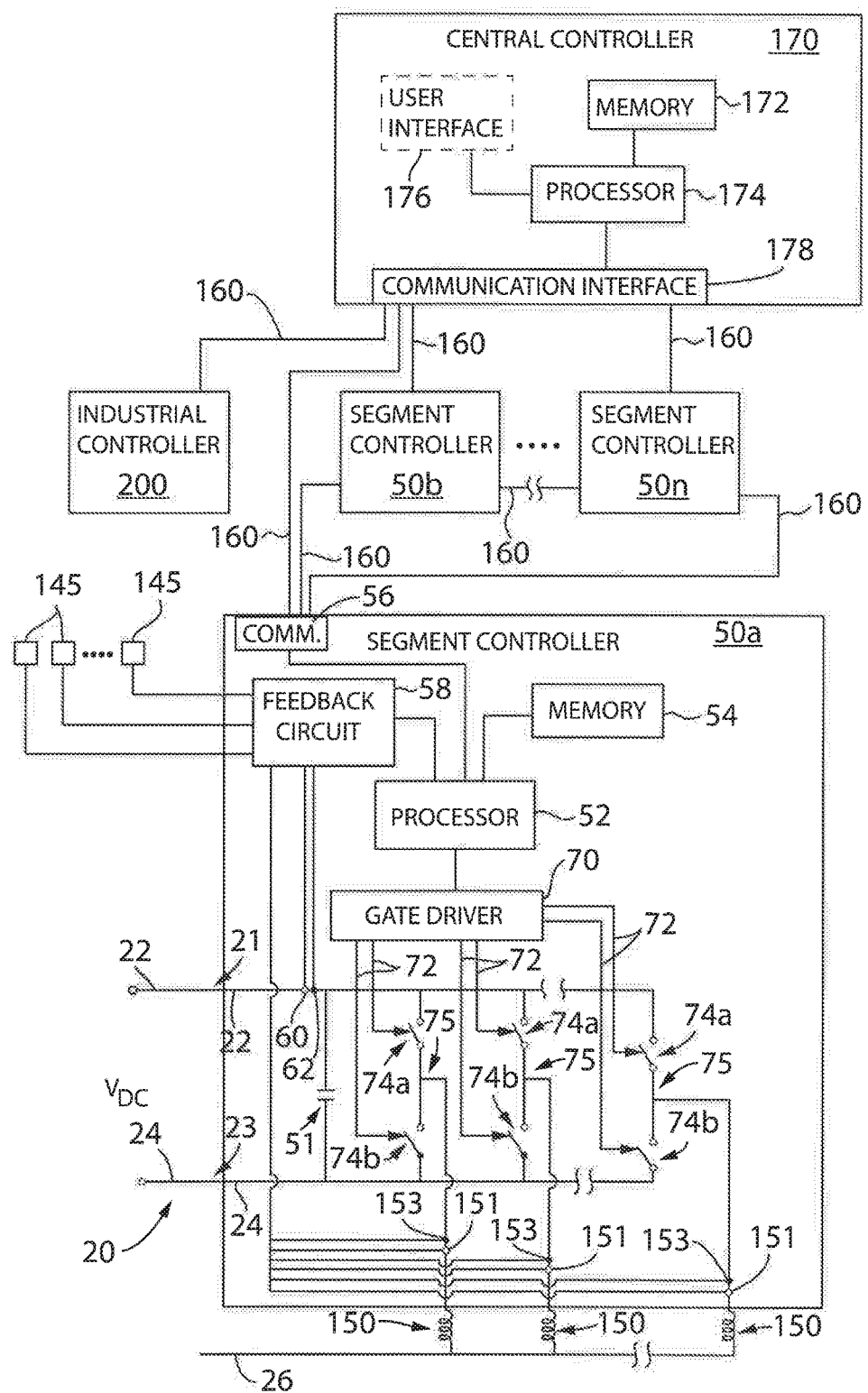
FIG. 6 is a block diagram representation of the exemplary control system of FIG. 1.

With reference also to FIG. 6, the central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 50 on each track segment via a network medium 160. The central controller 170 may transfer a command signal to one or more power segments in each track segment to control energization of the coils 150. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may be configured to transfer the desired motion commands, or a portion thereof, from the central controller 170 to each of the segment controllers 50. The motion commands identify one or more desired movers 100 to be positioned at or moved along each track segment 12. The central controller 170 may distribute motion commands to each segment controller 50 according to the mover located at or proximate to the track segment 12. The corresponding segment controller 50 for each track segment 12 may, in turn, determine the appropriate command signals for each mover 100 and transmit the command signals to one or more power segments in each track segment to control energization of the coils 150. Distributed control can minimize the amount of communication in the system by allowing segment controllers 50, rather than the central controller 170, to control driving each mover 100 along the track 10.

A position feedback system provides knowledge of the location of each mover 100 along the length of the track segment 12 to the segment controller 50. In one embodiment, the position feedback system can include one or more position magnets 140 mounted to the mover 100 and an array of sensors 145 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 which corresponds to the magnet 140 passing the sensor 145.

The segment controller 50 also includes a communication interface 56 that receives communications from the central controller 170 and/or from adjacent segment controllers 50 in a path. The communication interface 56 extracts data from the message packets on the communication network and passes the data to a processor 52 executing in the segment controller 50. The processor may be a microprocessor. Optionally, the processor 52 and/or a memory device 54 within the segment controller 50 may be integrated on a field programmable array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates switching signals 72. Optionally, the processor 52 may incorporate the functions of the gate driver module 70 and directly generate the switching signals 72. The switching signals 72 are provided to the power conversion segment, in each track segment 12, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 2:
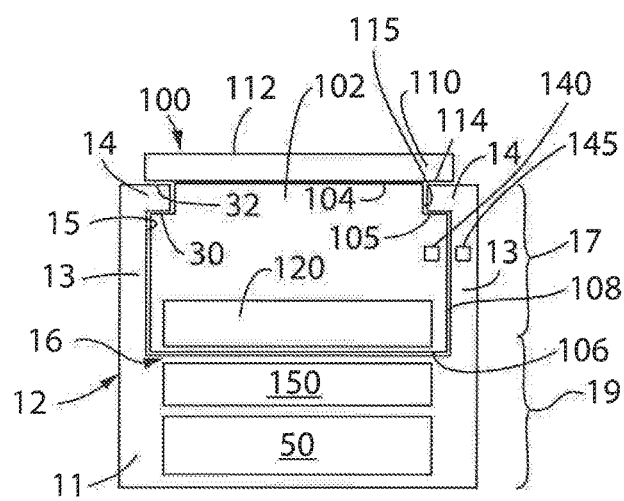
FIG. 2 is a sectional view of an exemplary mover and track segment included in the linear drive system taken at 2-2 of FIG. 1.

In operation, the central controller 170 receives a command from an external controller, such as the industrial controller 200 shown in FIG. 1, corresponding to a desired location, trajectory or motion for each mover 100. The command identifies one of the movers 100 and provides a desired operation of the mover 100. According to one embodiment of the invention, the desired operation may include a start location and a destination location between which the mover 100 is to travel. Optionally, the desired operation may simply include a destination location where the start location is the current location of the mover 100. The desired operation may further include, for example, a desired speed, or velocity, of travel as well as a desired rate of change of the speed, or acceleration, at which the mover 100 is to be driven to reach the destination. Optionally, the desired velocity or the desired acceleration may be stored in the memory 172 of the controller 170 or in the memory 54 of the segment controller 50. It is further contemplated that multiple settings for the desired velocity and/or desired acceleration may be stored in the memory (54 or 172) based, for example, on the present location of the mover 100, the type of track segment (e.g., straight vs. curved), the payload on the mover 100, or a combination thereof. If a centralized controller is controlling operation of each mover 100, the centralized controller generates a motion profile for the mover 100 as a function of the desired operation and, in turn, generates control signals to the power section of each segment to achieve the desired operation.

If the track 10 is arranged with distributed control, the central controller 170 may generate motion profiles for each mover 100 along the track segment on which they are presently located and transmit the motion profiles to the corresponding segment controllers 50. The segment controller 50, in turn, controls operation of the mover 100 to execute the motion profile, whether generated by the central controller 170 or generated locally. The segment controller 50 may include a position and/or a velocity loop to regulate the position of each mover 100. Each mover 100 includes at least one position magnet 140 and, according to the illustrated embodiment, each mover 100 includes an array of position magnets 140 mounted on the mover 100. In another aspect, one or more magnets can instead be used as both the drive magnet and the position magnet. The position magnets 140 pass by an array of position sensors 145 as the mover 100 travels along the track segment, generating position feedback signals 225. A position loop may utilize the position feedback signals 225 directly to regulate the position of the mover 100 to achieve a desired position or desired position profile along the track segment 12. The processor 52 in the segment controller 50 may also convert the position feedback signals 225 to a velocity feedback signal according to known methods and provide the velocity feedback signal to a velocity loop to achieve a desired speed or desired speed profile along the track segment 12.

Figure 7:
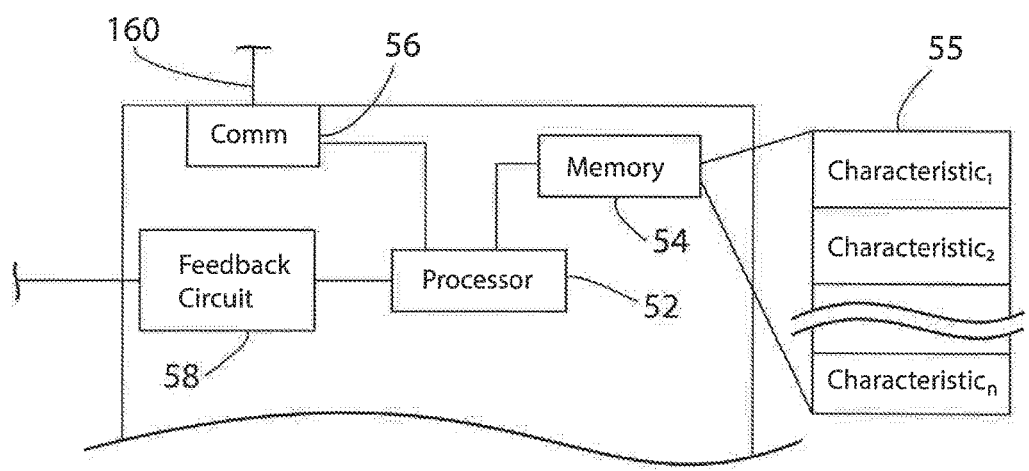
FIG. 7 is partial block diagram representation of a segment controller of FIG. 6.

As a mover 100 is traveling along a track segment 12, the processor 52 in the segment controller 50 receives the position feedback signal corresponding to the movers 100 motion. As indicated above, the position feedback signal may be generated by a series of sensors of position sensors 145 generating signals corresponding to the position magnets 140 present on the mover 100. The signals from position sensors 145 are converted to a location of the mover 100 along the length of the segment. At the start of each commanded move, the processor 52 reads the initial position of the mover 100 and stores the initial position in memory 54. As the mover 100 travels along the track segment 12, the processor determines the new position of each mover and determines a difference in position between the new position and the initial position. The difference in position is also stored in the memory 54. In this manner, the segment controller 50 maintains a distance the mover traveled during each commanded move. As illustrated in FIG. 7, the distance traveled during the commanded move may be stored as an operating characteristic 55 for the mover 100.

Figure 8:
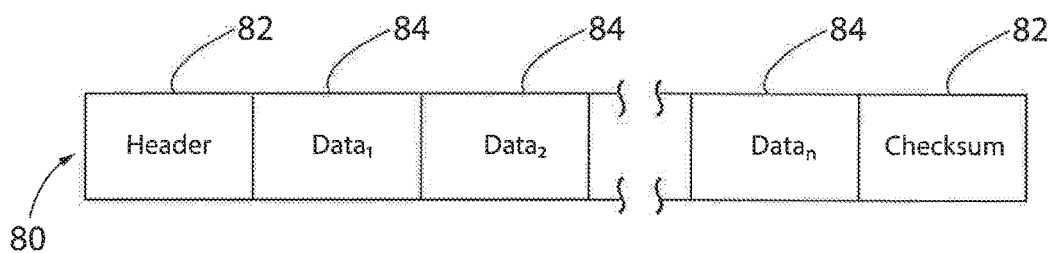
FIG. 8 is an exemplary data packet transmitted between distributed segment controllers in FIG. 6.

Each commanded move will typically require a mover 100 to travel over multiple track segments 12. Thus, when a mover 100 transitions between track segments, the segment controller 50 of a first track segment, from which the mover is transitioning, transmits the stored operating characteristic(s) 55 to the segment controller of a second track segment, to which the mover is transitioning. The segment controller 50 of the first track segment generates a data packet 80 in which the operating characteristic(s) 55 are included as data 84, see also FIG. 8. The segment controller 50 of the second track segment extracts the operating characteristic(s) 55 for the mover 100 transitioning onto the corresponding track segment and stores the operating characteristic(s) 55 in the memory 54 for the new segment controller 50. As the mover 100 continues to travel along the second track segment responsive to the initial move command, the processor 52 for the second segment controller 50 may continue to update the operating characteristic 55 for the mover. The process repeats as the mover 100 transitions between each successive track segment such that the operating characteristic(s) 55 being stored for each mover "travel" along the track 10 between successive segment controllers 50 along with the mover 100.

According to one aspect of the invention, it is contemplated that one of the operating characteristics 55 being stored is total distance traveled during a move command. At the start of each commanded move, the processor 52 reads the initial position of the mover 100 and stores the initial position in memory 54. As the mover 100 travels along the track segment 12, the processor determines the new position of each mover and determines a difference in position between the new position and the initial position. The difference in position is also stored in the memory 54. When a mover 100 reaches the end of one track segment 12, the initial position and/or the difference in position are included in the data 84 of the message packet 80 generated and transmitted to the adjacent segment controller 50. Thus, as the mover 100 is traveling along a track segment 12 there is no communication required on the industrial network to maintain a record of the distance traveled during the move command. A single data packet is transmitted between adjacent segment controllers 50 as a mover 100 transitions between the two segment controllers 50.

Optionally, the segment controller 50 may be configured to periodically transmit a data packet 80 to the central controller with the monitored operating characteristic 55 (e.g., the distance traveled). However, the periodic update rate may be at a substantially reduced rate than the interval at which the distance traveled is updated. For example, the segment controller 50 may monitor the position feedback signal and update the distance traveled stored as an operating characteristic at one or two millisecond (1 or 2 msec) intervals. In contrast, the segment controller 50 may be configured to transmit the stored operating characteristics 55 to a central controller 170 at one hundred or two hundred millisecond (100-200 msec) intervals.

When a second segment controller 50b receives a data packet 80 from an adjacent segment controller 50a, the second segment controller continues maintaining the record started by the first segment controller. The second segment controller stores either the starting position or the distance traveled during a move command and continues to monitor the distance from the start of the second track segment that the mover 100 has travelled. In one embodiment, the second segment controller 50 adds the additional distance traveled to the distance received from the first segment controller. In an alternate embodiment, the absolute position for movers continues to increment along the length of the track 10. As a result, the segment controller 50 may continue to determine a total distance by subtracting the current position on a second, or subsequent, track segment from the initial position of the mover 100 at the start of the move command to continue tracking a total distance traveled during the commanded move.

When the mover 100 has reached the destination, as specified by the move command, the segment controller 50 on which the mover 100 is presently located may generate a data packet 80 for transmission to the central controller 170 in which a total travel distance for the mover 100 is included. The segment controller 50 may be configured to then reset the travel distance for a mover 100 either after transmitting the total distance to a central controller 170 or when a new move command for the mover 100 is issued.

It is further contemplated that the segment controllers 50 may maintain a total distance travelled by each mover 100 over the life of the mover as another operating characteristic 55. In tandem with monitoring a total distance traveled during a single move command, each mover may have an operating characteristic 55 defined that maintains a record of the total distance traveled by the mover 100. This total distance may be utilized, for example, to determine when preventive maintenance is required on the mover. Rather than resetting the travel distance after each commanded move, the total travel distance stored as an operating characteristic 55 for the mover is continually incremented for each subsequent move.

It is contemplated that an external device, such as a programming terminal, a mobile computing device with an approved application, or the like may establish communications with the segment controller and/or the central controller 170 and issue a reset position command for a mover 100. The reset position command may be used to set the total travel distance of a mover 100 to zero and may be issued, for example, during commissioning of a system or after periodic maintenance is performed. The total distance traveled by the mover 100 over the life of the mover may be included in a data packet 80 with the distance traveled during a single move or in a separate data packet 80. It is further contemplated that the segment controller 50 may be configured to transmit data packets 80 according to either configuration and at differing periodic intervals according to the application requirements.

According to another aspect of the invention, it is contemplated that one of the operating characteristics 55 being stored by the segment controller 50 may be an instantaneous power loss associated with each mover 100. The instantaneous power loss corresponds to power lost in the track segment 12 as a result of driving the mover 100 along the track. The instantaneous power loss may be determined as a function of the current supplied to the coils 150 along the track by each segment controller 50. The power is determined as a square of the magnitude of current multiplied by the resistance of each coil 150. The resistance of each coil 150 may be determined during commissioning or may be a known value provided by a manufacturer of the coils and stored in memory 54 of the segment controller 50. Further, the length of the mover 100 may span multiple coils 150 and, therefore, multiple coils 150 may be energized in tandem to propel the mover 100 along the track. The instantaneous power loss for one mover 100 corresponds to the magnitude of current in each of the coils 150 energized multiplied by the corresponding resistance of the coil.

In one embodiment, the segment controller 50 receives feedback signals from current sensors 151 corresponding to a magnitude of current present in each coil 150. The segment controller uses the magnitude of current present in each coil, or coils, corresponding to one of the movers 100 to determine the instantaneous power loss resulting from driving the mover along the track 10.

In another embodiment, the segment controller 50 uses a commanded current determined by the processor 52 corresponding to a desired current used to drive the mover 100. The commanded current may be a single current corresponding to a total current required to drive the mover 100 or separate current values corresponding to each of the coils 150 that will be required to drive the mover 100.

The segment controller determines the square of the magnitude of current, whether using the feedback signals or the commanded current, and multiplies the square of the magnitude of the current by the resistance of each coil 150. The instantaneous power loss is stored as one of the operating characteristics 55 for the mover 100. The instantaneous power loss is determined at a fast, periodic interval (e.g., 250 μsec-2 msec) during which the current command for each coil 150 is determined. A new instantaneous power is determined and stored at each interval within the segment controller 50. However, the central controller 170 is updated at the slower interval (e.g., 100-200 msec) used to update the operating characteristics 55 at the central controller. Optionally, the central controller 170 may request an update, for example, when a technician is viewing a video interface.

According to another aspect of the invention, the operating characteristic 55 being determined by the segment controller 50 may be an instantaneous energy efficiency. During each fast, periodic interval, the segment controller 50 may monitor both a distance traveled during the period and an instantaneous power loss. The segment controller 50 determines the instantaneous energy efficiency as a function of both the distance traveled and the instantaneous power loss. The instantaneous power loss is multiplied by the length of the periodic interval. The distance traveled is, in turn, divided by the product of the instantaneous power loss and the length of the periodic interval to determine an instantaneous energy efficiency. The instantaneous energy efficiency may be stored as one of the operating characteristics 55 of the mover 100. Just as with the instantaneous power loss, a new instantaneous energy is determined and stored at each fast, periodic interval within the segment controller 50. However, the central controller 170 is updated at the slower interval (e.g., 100-200 msec) used to update the operating characteristics 55 at the central controller. Optionally, the central controller 170 may request an update, for example, when a technician is viewing a video interface.

According to still another aspect of the invention, the operating characteristic 55 being determined by the segment controller 50 may be an average energy efficiency experienced over the duration of a motion command.

At the start of each commanded move, the processor 52 verifies that the operating characteristic 55 has been reset or, optionally, resets the operating characteristic 55 storing the average energy efficiency. As the mover 100 begins to travel along the track segment 12, the processor determines the instantaneous energy efficiency during one of the fast, periodic intervals as discussed above. The instantaneous energy efficiency for the period is added to a running average of the energy efficiency as stored in the memory 54. During the first periodic interval, the running average stored in the operating characteristic 55 is reset to zero. Thus, the average is equal to the instantaneous energy efficiency determined during the first period and this value is stored in memory.

During each subsequent periodic interval, the running average of the energy efficiency is updated with the instantaneous energy efficiency determined during the corresponding period. The segment controller 50 maintains a count of the number of periodic intervals that have occurred during the commanded move. During each subsequent periodic interval, the newly determined value of the instantaneous energy efficiency is added to the previously stored average value of energy efficiency and divided by the total number of periodic intervals that have occurred during the commanded move.

When a mover 100 reaches the end of one track segment 12, the total number of periodic intervals that have occurred during the commanded move and the stored average value of energy efficiency are included in the data 84 of the message packet 80 generated and transmitted to the adjacent segment controller 50. Each subsequent segment controller 50 may continue to monitor the average energy efficiency of a mover 100 as it is driven along the track 10. Additionally, as the mover 100 is traveling along a track segment 12 there is no communication required on the industrial network to maintain a record of the average energy efficiency during the move command. A single data packet is transmitted between adjacent segment controllers 50 as a mover 100 transitions between the two segment controllers 50.

Similar to the other monitored operating characteristics 55, the segment controller 50 may be configured to periodically transmit a data packet 80 to the central controller with the monitored operating characteristic 55 (e.g., average energy efficiency). However, the periodic update rate may be at a substantially reduced rate than the interval at which the average energy efficiency is updated. For example, the fast, periodic interval at which the segment controller 50 updates the average energy efficiency may occur at two hundred fifty micro second to two millisecond (250 μsec to 2 msec) intervals. In contrast, the segment controller 50 may be configured to transmit the stored operating characteristics 55 to a central controller 170 at one hundred or two hundred millisecond (100-200 msec) intervals.

According to still another aspect of the invention, the segment controllers 50 may maintain an average energy efficiency of a mover 100 over the life of the mover as another operating characteristic 55. In tandem with monitoring an average energy efficiency during a single move command, each mover may have an operating characteristic 55 defined that maintains a record of the total average energy efficiency experienced by the mover 100 over the life of the mover 100. This total average energy efficiency may be utilized, for example, to determine when preventive maintenance is required on the mover. Rather than resetting the average energy efficiency after each commanded move, the total average energy efficiency for the mover is continually updated for each subsequent move.

It is contemplated that an external device, such as a programming terminal, a mobile computing device with an approved application, or the like may establish communications with the segment controller and/or the central controller 170 and issue a reset average energy efficiency command for a mover 100. The reset average energy efficiency command may be used to set the total average energy efficiency of a mover 100 to zero and may be issued, for example, during commissioning of a system or after periodic maintenance is performed. The total average energy efficiency experienced by the mover 100 over the life of the mover may be included in a data packet 80 with the energy efficiency during a single move or in a separate data packet 80. It is further contemplated that the segment controller 50 may be configured to transmit data packets 80 according to either configuration and at differing periodic intervals according to the application requirements.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A linear drive system comprising:
   a plurality of movers;
   a track including a plurality of track segments, wherein each track segment includes:
      a plurality of coils positioned along a length of the track segment, and
      a segment controller, wherein each segment controller further includes:
         a communication interface operative to communicate with at least one other segment controller located in an adjacent track segment,
         at least one position sensor operative to generate a position feedback signal corresponding to a presence of one of the plurality of movers along the length of the track segment,
         a processor operative to:
            receive a motion command,
            control operation of each of the plurality of coils to drive at least one of the plurality of movers along the track segment responsive to the motion command,
            determine an operating characteristic of the at least one mover driven along the track segment, wherein the operating characteristic is selected from one of a length of travel and a power loss for the at least one mover driven along the track segment,
            generate a data packet corresponding to the at least one mover, wherein the data packet includes the operating characteristic, and
            transfer the data packet to the at least one other segment controller in the adjacent track segment via the communication interface when the mover is driven from the track segment to the adjacent track segment.

2. The linear drive system of claim 1 wherein:
the operating characteristic is the length of travel, and
the length of travel along the track segment is added to an existing length of travel, wherein the existing length of travel is received from a prior track segment.

3. The linear drive system of claim 2 wherein:
the data packet includes a first length of travel and a second length of travel,
the first length of travel corresponds to the motion command, and
the second length of travel corresponds to a plurality of motion commands.

4. The linear drive system of claim 1 wherein:
the operating characteristic is the power loss for the at least one mover, and
the power loss is an instantaneous power loss determined as a function of a magnitude of current present in a plurality of coils, wherein each of the plurality of coils is energized to drive the at least one mover.

5. The linear drive system of claim 4 wherein the magnitude of current is a commanded current.

6. The linear drive system of claim 4 wherein each track segment further includes a plurality of current sensors, each current sensor generating a signal corresponding to a current present in one of the plurality of coils and wherein the magnitude of current is a function of the signals generated by the plurality of current sensors.

7. The linear drive system of claim 4 wherein:
the power loss corresponds to an instantaneous energy efficiency of the at least one mover, and
wherein the instantaneous energy efficiency is determined as a function of the length of travel and of the instantaneous power loss.

8. The linear drive system of claim 7 wherein:
the processor is operative to generate a current command for the plurality of coils at a periodic interval,
the instantaneous energy efficiency is determined during each periodic interval,
the data packet further includes an average power loss wherein the instantaneous energy efficiency for each periodic interval is averaged with the instantaneous energy efficiency for each additional periodic interval during travel of the at least one mover resulting from the motion command.

9. A linear drive system comprising:
a plurality of movers;
a track including a plurality of track segments, wherein each track segment includes:
 a plurality of coils positioned along a length of the track segment, wherein energization of the plurality of coils is sequenced to drive the plurality of movers along a length of the track segment, and
 at least one sensor operative to generate a feedback signal corresponding to a presence of one of the plurality of movers along the length of the track segment; and
a controller operative to:
 receive a motion command for each of the plurality of movers,
 control energization of the plurality of coils to drive each of the movers along the track segment responsive to the motion command,
 execute at a periodic interval to generate a plurality of current commands for the plurality of coils, wherein each of the plurality of current commands corresponds to one of the plurality of movers,
 determine a total magnitude of current present during one periodic interval in each of the plurality of coils energized to drive one of the plurality of movers responsive to one of the plurality of current commands, and
 determine a power loss for each of the plurality of movers as a function of the total magnitude of current in each of the plurality of coils energized to drive the mover.

10. The linear drive system of claim 9 wherein the controller further includes:
a central controller operative to receive the motion command and to generate a plurality of distributed motion commands; and
a plurality of segment controllers, wherein:
 each segment controller is mounted in one of the plurality of track segments,
 each segment controller is in communication with the central controller and with at least one other segment controller located in an adjacent track segment,
 the central controller transmits each of the plurality of distributed motion commands to one of the segment controllers, and
 each segment controller controls energization of the plurality of drive coils on the corresponding track segment and determines the power loss for each of the plurality of movers present on the corresponding track segment.

11. The linear drive system of claim 10 wherein each of the plurality of segment controllers is further operative to
generate a data packet corresponding to each of the plurality of movers present on the corresponding track segment, wherein the data packet includes the power loss, and
transfer the data packet to the at least one other segment controller in the adjacent track segment when the mover is driven from the track segment to the adjacent track segment.

12. The linear drive system of claim 11 wherein the segment controller is further operative to determine an instantaneous energy efficiency of the at least one mover as a function of the power loss and a distance traveled by the at least one mover during the periodic interval.

13. The linear drive system of claim 12 wherein the segment controller is further operative to determine an average energy efficiency as a function of the instantaneous energy efficiency over a plurality of periodic intervals wherein the average energy efficiency is included in the data packet corresponding to the at least one mover.

14. The linear drive system of claim 10 wherein the total magnitude of current is a commanded current.

15. The linear drive system of claim 10 wherein each track segment further includes a plurality of current sensors, each current sensor generating a signal corresponding to a current present in one of the plurality of coils and wherein the total magnitude of current is a function of the signals generated by the plurality of current sensors.

16. A method for monitoring operation of each mover in a linear drive system, wherein the linear drive system includes a plurality of movers and a track having a plurality of track segments, the method comprising the steps of:
receiving a motion command at a segment controller for one of the plurality of track segments;
controlling operation of a plurality of coils spaced along a length of the track segment with the segment controller to drive at least one of the plurality of movers along the track segment responsive to the motion command;

determining an operating characteristic of the at least one mover driven along the track segment, wherein the operating characteristic is selected from one of a length of travel and a power loss for the at least one mover driven along the track segment, generating a data packet corresponding to the at least one mover, wherein the data packet includes the operating characteristic, and transferring the data packet to at least one other segment controller in an adjacent track segment when the mover is driven from the track segment to the adjacent track segment.

17. The method of claim 16 further comprising the steps of:

monitoring a length of travel along the track segment by the at least one mover, wherein the length of travel is the operating characteristic; and adding the length of travel to an existing length of travel, wherein the existing length of travel is received from a prior track segment.

18. The method of claim 16 further comprising the step of determining a power loss for the at least one mover, wherein the power loss is the operating characteristic, the power loss is an instantaneous power loss determined as a function of a magnitude of current present in a plurality of coils, and each of the plurality of coils is energized to drive the at least one mover.

19. The method of claim 18 wherein the magnitude of current is one of a commanded current and a current feedback signal generated by at least one current sensor and wherein the current feedback signal from each current sensor corresponds to a current present in one of the plurality of coils.

20. The method of claim 18 wherein the power loss corresponds to an instantaneous energy efficiency of the at least one mover, and wherein the energy efficiency is determined as a function of the length of travel and of the instantaneous power loss.

* * * * *